United States Patent [19]
Dennison Buck et al.

[11] Patent Number: 5,947,612
[45] Date of Patent: Sep. 7, 1999

[54] BEARING RETENTION FOR A ROTATING MACHINE

[75] Inventors: David Frank Dennison Buck, Ridgefield, Wash.; Kevin Roy Harpenau, Ann Arbor, Mich.; Brian Scott Phillips, Canton, Mich.; Steven John Yockey, Ann Arbor, Mich.

[73] Assignee: Ford Motor Company, Dearborn, Mich.

[21] Appl. No.: 09/032,809

[22] Filed: Mar. 2, 1998

[51] Int. Cl.⁶ .................................................... F16C 27/04
[52] U.S. Cl. .......................................... 384/536; 384/489
[58] Field of Search .................................... 384/489, 535, 384/536, 537, 538, 559, 581, 582, 584, 585, 906

[56] References Cited

U.S. PATENT DOCUMENTS

| | | | |
|---|---|---|---|
| 3,050,352 | 8/1962 | Moxley | 384/536 |
| 4,368,933 | 1/1983 | Motsch | 384/489 X |
| 5,062,721 | 11/1991 | Chiba | 384/536 |
| 5,214,335 | 5/1993 | Phillips et al. | 310/232 |
| 5,344,240 | 9/1994 | Tatro et al. | 384/569 |
| 5,452,504 | 9/1995 | Tatro et al. | 29/597 |
| 5,598,600 | 2/1997 | Stegens | 384/489 X |

Primary Examiner—Thomas R. Hannon
Attorney, Agent, or Firm—Mark S. Sparschu

[57] ABSTRACT

A rotating machine comprises a housing defining a generally cylindrical bearing pocket and defining an interior and exterior. The machine also includes a bearing retainer having a generally cylindrical sleeve portion retained in the bearing pocket and a bearing having an outer race and an inner race, the outer race affixed within the cylindrical sleeve portion. The machine further has a rotating member mounted on a shaft for rotation therewith, the shaft having a portion affixed within the inner race of the bearing. In one embodiment, the bearing retainer includes anti-rotation keying projections the bearing pocket includes complementary depressions for the keying projections. The keying projections cooperate with the complementary depressions to prevent rotation of the bearing retainer with respect to the bearing pocket. In another embodiment, a cap is affixed to the bearing retainer to substantially prevent contamination from reaching the bearing from the exterior.

6 Claims, 2 Drawing Sheets

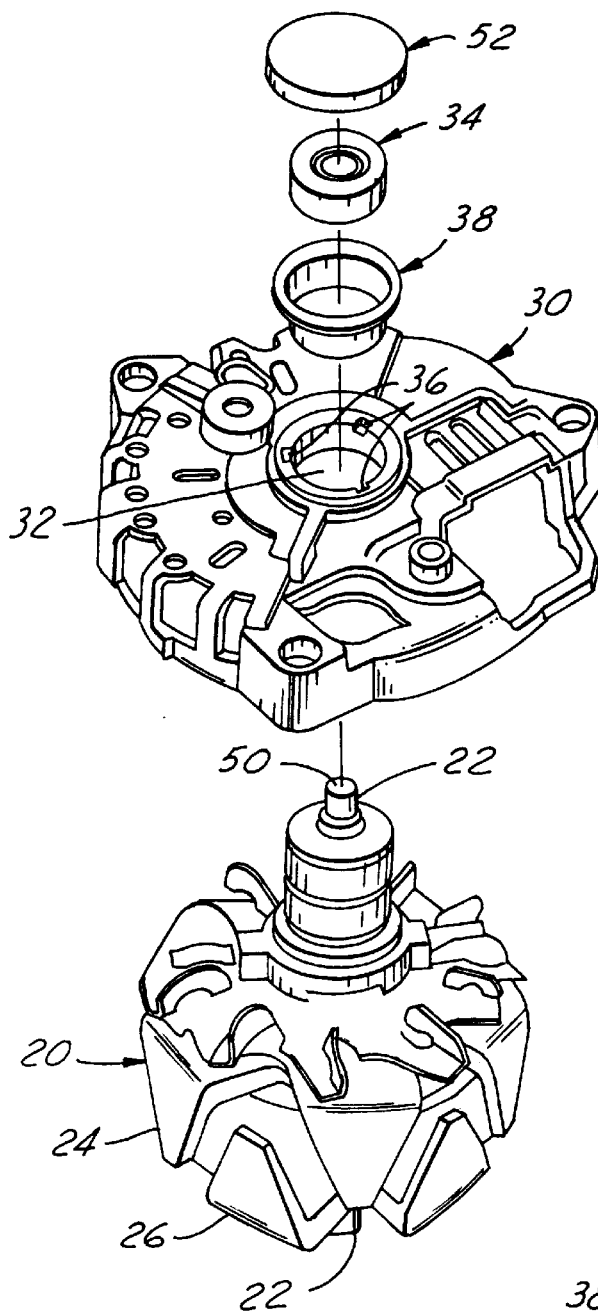
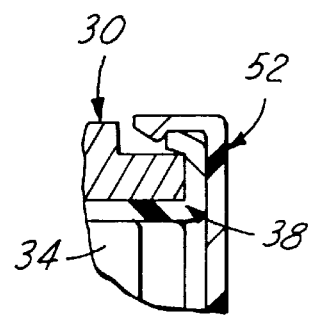
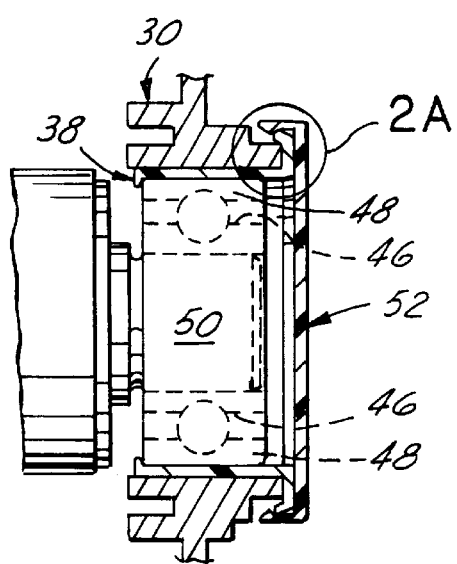
FIG. 1
FIG. 2A
FIG. 2

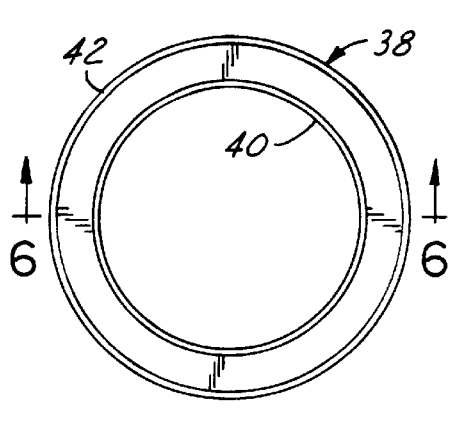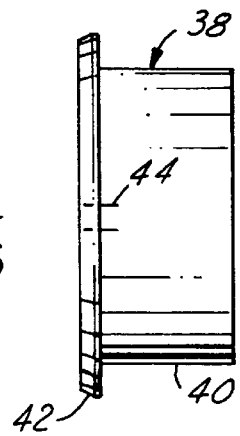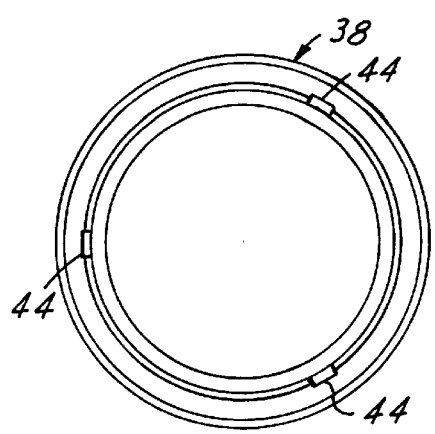
FIG.3  FIG.4  FIG.5
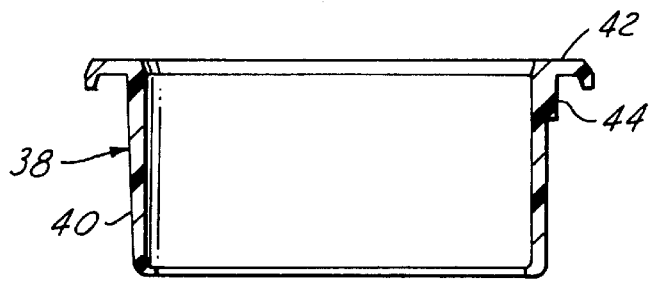
FIG.6
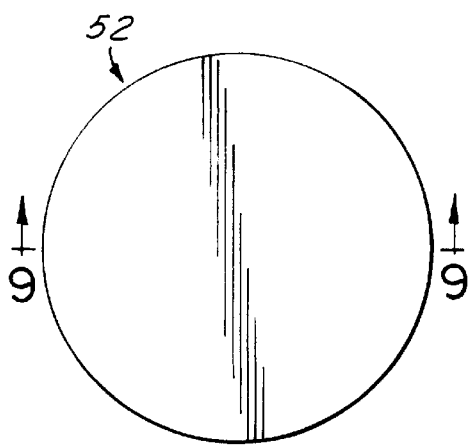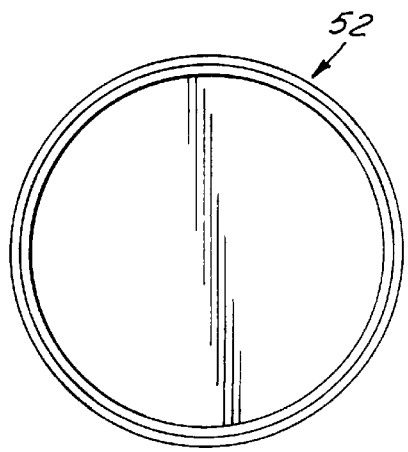
FIG.7  FIG.8
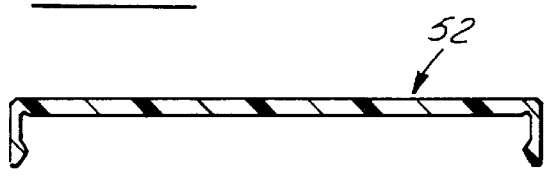
FIG.9

BEARING RETENTION FOR A ROTATING MACHINE

BACKGROUND OF THE INVENTION

1. Field of the Invention

The present invention relates generally to rotating machines and more specifically to designs for retaining bearings in rotating machines.

2. Description of the Related Art

In rotating machines, a rotating member affixed to a shaft is frequently supported on at least one end by a bearing. The bearing is affixed within a bearing pocket in a housing of the machine.

In some cases, assembly of the machine can be facilitated if the rotor is assembled within the two halves of the housing prior to incorporation of the aforementioned bearing. When the machine is so assembled, an end of the shaft protrudes into the bearing pocket. A bearing is then simultaneously pressed both into the pocket (the outer race of the bearing) and onto the shaft (the inner race of the bearing). However, some manner must be provided to allow axial movement of the bearing into the bearing pocket for this assembly sequence to be successful.

One way to allow axial movement of the bearing is to use a bearing having an "expansion compensation" band, an elastomeric band, about the outer race. Such a bearing, however, is expensive and is available from a relatively limited number of suppliers. Another way to allow axial movement is to heat the housing to expand the bearing pocket immediately prior to insertion of the bearing. However, when the housing cools and the bearing pocket contracts, the resulting stresses may pre-load the bearing. This can shorten bearing life. Thus, an improved design which allows for axial movement of the bearing during assembly will facilitate the use of cost-effective standard bearings without the stresses introduced through heating the housing of the machine.

Also, protecting the bearing from external contaminants is important in assuring long bearing life. In a presently-known design, a stamped metal dust cover is pressed into the housing to cover the exterior of the bearing. However, dust covers installed in that manner may not always be adequately secure. Thus, a design which cost-effectively and robustly provides for protection of the bearing will be advantageous.

SUMMARY OF THE INVENTION

The present invention provides a rotating machine. The machine comprises a housing defining a generally cylindrical bearing pocket and a bearing retainer having a generally cylindrical sleeve portion retained in the bearing pocket. The machine also includes a bearing having an outer race and an inner race, the outer race affixed within the cylindrical sleeve portion. Also, the machine comprises a rotating member mounted on a shaft for rotation therewith, the shaft having a portion affixed within the inner race of said bearing. One of the bearing retainer and the bearing pocket includes anti-rotation keying projections. The other of the bearing retainer and the bearing pocket includes complementary depressions for the keying projections, the keying projections cooperating with the complementary depressions to prevent rotation of the bearing retainer with respect to the bearing pocket.

The present invention also provides a second rotating machine design. The machine includes a housing defining a generally cylindrical bearing pocket and further defining an interior and an exterior of the housing. The machine also comprises a bearing retainer having a generally cylindrical sleeve portion retained in the bearing pocket, and a bearing having an outer race and an inner race, the outer race pressed within the cylindrical sleeve portion. The machine further includes a rotating member mounted on a shaft for rotation therewith, the shaft having a portion thereof pressed within the inner race of the bearing. Also, the machine includes a cap affixed to the bearing retainer to substantially prevent contamination from reaching the bearing from the exterior.

The present invention can provide designs which allow the use of standard bearings in rotating machines in applications where the bearing is installed after the housing is installed. This can reduce cost and improve reliability over alternative designs. Further, some embodiments of the present invention provide cost-effective and robust protection of the bearing from external contaminants.

BRIEF DESCRIPTION OF THE DRAWINGS

FIG. 1 is an exploded view of a bearing retention design according to one embodiment of the present invention.

FIG. 2 is a cross-sectional view through bearing retainer 38, bearing 34 and cap 52 of FIG. 1.

FIG. 2A is an enlarged view of the area within circle 2A of FIG. 2.

FIGS. 3, 4 and 5 are three views of bearing retainer 38.

FIG. 6 is a cross-sectional view of bearing retainer 38 taken along line 6—6 of FIG. 3.

FIGS. 7 and 8 are two views of cap 52.

FIG. 9 is a cross-sectional view of cap 52 taken along line 9—9 of FIG. 7.

DETAILED DESCRIPTION OF THE PREFERRED EMBODIMENT

Refer first to FIGS. 1, 2 and 2A. Illustrated there are the relevant portions of a bearing retention design for a rotating machine. In the particular embodiment illustrated here, the rotating machine is an alternator. A rotor 20 includes a shaft 22 on which pole pieces 24 and 26 are mounted for rotation therewith about the axis of shaft 22. The alternator also includes a metallic housing 30 which defines an interior of the housing (in which rotor 20 resides) and an exterior of the housing. Housing 30 defines a generally-cylindrical bearing pocket 32, designed to accommodate a bearing 34. Bearing pocket 32 includes notches 36, whose function will be described immediately below.

A plastic bearing retainer 38 (see also FIGS. 3–6) includes a cylindrical sleeve portion 40 and a flange 42. Bearing retainer 38 also includes keying projections 44. Bearing retainer 38 is inserted into bearing pocket 32, with keying projections 44 cooperating with notches 36 to prevent rotation of bearing retainer 38 with respect to bearing pocket 32.

Bearing 34 (which includes an inner race 46 and an outer race 48) is pressed within cylindrical sleeve portion 40 of bearing retainer 38, and preferably simultaneously, onto end portion 50 of shaft 22 of rotor 20. This sequence is preferably accomplished by assembling housing 20 with its mating half (not shown) prior to installation of bearing 34. End portion 50 of shaft 22 thus extends into bearing pocket 32. Bearing retainer 38 and bearing 34 are then preferably installed. Such installation of bearing retainer 38 and bearing 34 is facilitated if the alternator is oriented such that the axis of shaft 22 is vertical.

A plastic cap 52 (see also FIGS. 7–9) is then snapped onto flange 42 of sleeve portion 40 of hearing retainer 38. Cap 52 prevents contaminants from external to housing 30 from contaminating bearing 34.

The design disclosed herein allows axial movement of bearing 34 with respect to bearing pocket 32, facilitating assembly of the machine. The outer race of bearing 34 is, nonetheless, securely fastened against rotation with respect to bearing pocket 32. The design disclosed herein further provides robust and cost-effective retention of cap 52 to protect bearing 34 from contamination.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotating machine comprising:

housing defining a generally cylindrical bearing pocket;

a bearing retainer having a generally cylindrical sleeve portion retained in said bearing pocket;

a bearing having an outer race and an inner race, said outer race affixed within said cylindrical sleeve portion; and a rotating member mounted on a shaft for rotation therewith, said shaft having a portion affixed within said inner race of said bearing; wherein one of said bearing retainer and said bearing pocket includes anti-rotation keying projections; and the other of said bearing retainer and said bearing pocket includes complementary depressions for said keying projections, said keying projections cooperating with said complementary depressions to prevent rotation of said bearing retainer with respect to said bearing pocket;

wherein said bearing retainer is made of elastic.

2. A rotating machine as recited in claim 1, wherein said bearing retainer includes said anti-rotation keying projections.

3. A rotating machine as recited in claim 1, wherein said rotating machine is an alternator.

4. A rotating machine comprising:

a housing defining a generally cylindrical bearing pocket and further defining an interior and an exterior of said housing;

a bearing retainer having a generally cylindrical sleeve portion retained in said bearing pocket;

a bearing having an outer race and an inner race, said bearing pressed within said cylindrical sleeve portion;

a rotating member mounted on a shaft for rotation therewith, said shaft having a portion thereof pressed within said inner race of said bearing; and a cap affixed to said bearing retainer to substantially prevent contamination from reaching said bearing from said exterior.

5. A rotating machine as recited in claim 4, wherein said bearing retainer includes a flange exterior to said housing and wherein said cap is snap-fit to said flange.

6. A rotating member as recited in claim 5, wherein said bearing retainer and said cap are made of plastic.

* * * * *